United States Patent
Cao et al.

(10) Patent No.: US 7,689,233 B2
(45) Date of Patent: Mar. 30, 2010

(54) REMOTE SWITCHING FOR HANDSET HANDSFREE SPEAKERPHONE

(75) Inventors: James Cao, Vancouver (CA); James Maxwell, Vancouver (CA)

(73) Assignee: Vtech Telecommunications Limited, Tai Po, New Territories (HK)

(*) Notice: Subject to any disclaimer, the term of this patent is extended or adjusted under 35 U.S.C. 154(b) by 512 days.

(21) Appl. No.: 11/501,701

(22) Filed: Aug. 10, 2006

(65) Prior Publication Data

US 2007/0155380 A1 Jul. 5, 2007

Related U.S. Application Data

(60) Provisional application No. 60/754,606, filed on Dec. 30, 2005.

(51) Int. Cl.
 *H04W 4/00* (2006.01)
(52) U.S. Cl. ............... 455/462; 455/465; 455/569.1; 455/79; 379/127.01; 379/420.01; 370/276; 370/296
(58) Field of Classification Search ............. 455/462, 455/426, 465, 569.1, 79; 379/61, 389
 See application file for complete search history.

(56) References Cited

U.S. PATENT DOCUMENTS

| 4,580,013 | A | * | 4/1986 | Moisin ............... 379/388.01 |
| 4,706,274 | A | * | 11/1987 | Baker et al. ............. 455/462 |
| 5,572,575 | A | * | 11/1996 | Yamamoto et al. ...... 455/412.1 |
| 5,629,976 | A | * | 5/1997 | Loke et al. ............... 370/280 |
| 5,748,707 | A |   | 5/1998 | Sanserino |
| 5,752,195 | A | * | 5/1998 | Tsuji et al. ............... 455/462 |
| 5,758,271 | A | * | 5/1998 | Rich et al. ............. 455/234.1 |
| 5,933,493 | A | * | 8/1999 | Rijnberg et al. ....... 379/388.05 |
| 5,982,755 | A | * | 11/1999 | Forrester et al. ......... 370/278 |
| 6,522,634 | B1 | * | 2/2003 | Ohashi ................... 370/280 |
| 6,745,055 | B1 | * | 6/2004 | Iyengar et al. ......... 455/569.1 |

* cited by examiner

*Primary Examiner*—Nick Corsaro
*Assistant Examiner*—Chuong A Ngo
(74) *Attorney, Agent, or Firm*—Paul, Hastings, Janofsky & Walker LLP (57) ABSTRACT

A remote switching for handset handsfree speakerphone operation in a telephone system including an "off of shelf" analog half duplex switching speakerphone IC on a base unit and routs handset handsfree signals via a RF link to and from a microphone and a speakerphone of at least one cordless handset. The remote switching provides a handset handsfree feature on any analog and digital platform that is not equipped with DSPs or other digital means for embedded speakerphone algorithms.

18 Claims, 6 Drawing Sheets

REMOTE SWITCHING FOR HANDSET HANDSFREE SPEAKERPHONE

This application claims the benefit of U.S. Provisional Patent Application No. 60/754,606, filed on Dec. 30, 2005, which is herein incorporated by reference in its entirety.

BACKGROUND

I. Field of the Invention

The invention relates generally to a cordless telephone system, and more particularly, to a non-DSP (Digital Signal Processing) or non-digital telephone system having a handset handsfree speakerphone feature.

II. Background of the Invention

Figure 1:
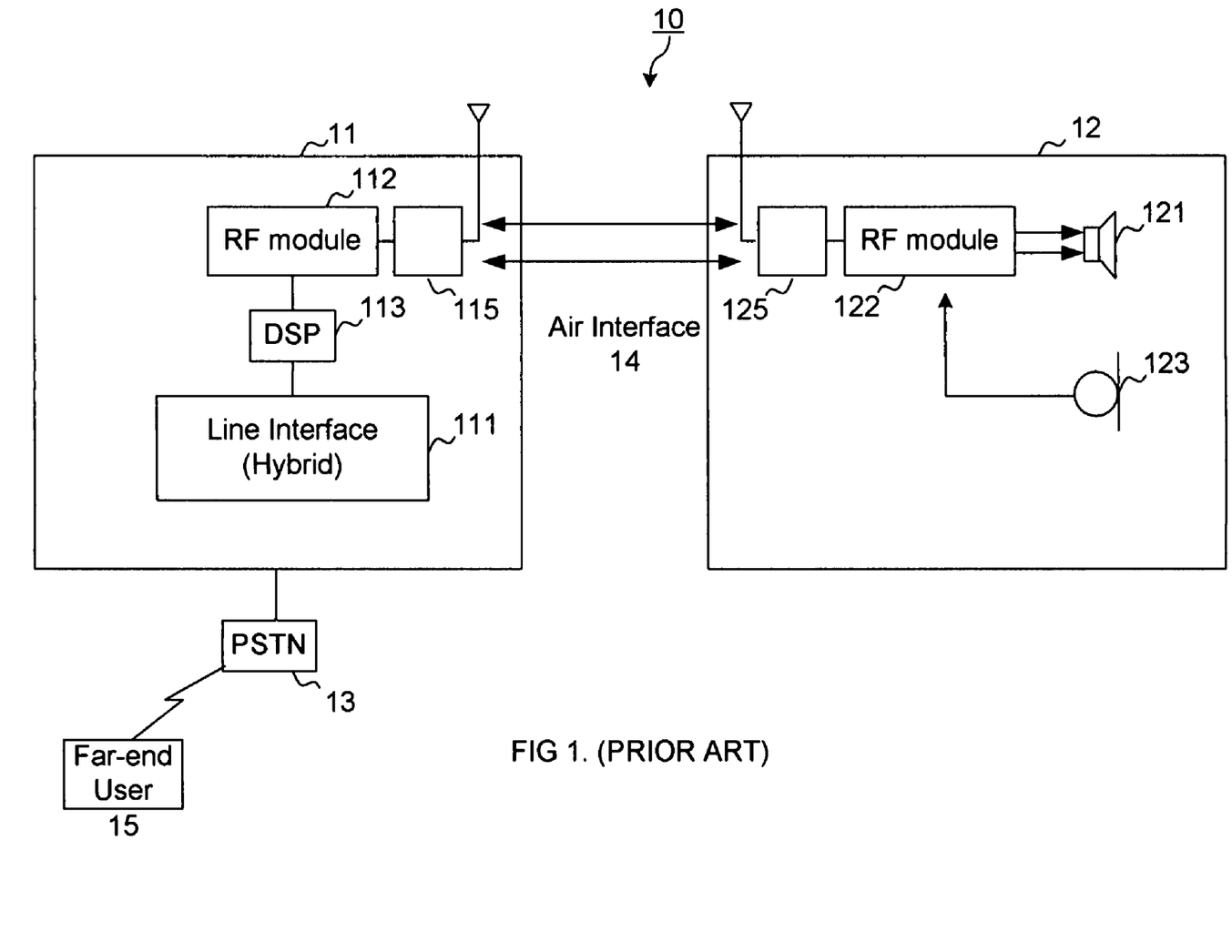
FIG. 1 is a block diagram of a prior art digital telephone system.

As shown in FIG. 1, a typical cordless telephone system 10 includes a base unit 11 and at least one cordless handset 12. Base unit 11 is coupled to PSTN 13 via a PSTN interface and communicates with cordless handset 12 via an air interface 14. In operation, when a far end user 15 is speaking, the audio will travel through a telephone line to a line interface circuitry (Hybrid) 111 of base unit 11. The audio is then gone through some gain adjustment and filtering before it is sent to an RF module 112 of the base unit 11. RF module 112 modulates the audio signal to an RF signal for being transmitted by a transceiver 115 via air interface 14 such as an FM radio to cordless handset 12. Cordless handset 12 includes a transceiver 125 that receives the RF signal from base unit 11, an RF module 122 that demodulates the RF signal to the original audio. A receiver 121 of cordless handset 12 receives the original audio and converts the demodulated signal to sound so that a user (not shown) can hear the speech from the far end user. Similarly, when the user speaks, a microphone 123 of cordless handset 12 converts the speech to an electrical signal that is then modulated by RF module 122 and is sent out to base unit 11, where it is demodulated and sent to Hybrid 111 and transmitted to far-end user 15 via PSTN 13.

For digital cordless telephone system, either base unit 11 or handset 12 can also include a DSP (Digital Signal Processor) or a digital means such as a powerful microprocessor 113 (only shown in base unit 11 of FIG. 1) to process an embedded speakerphone algorithm that supports a handsfree function. By means of the handsfree speakerphone algorithm, a user can make/receive a telephone call without picking up the handset.

Traditionally, it is difficult to implement the handsfree speakerphone function on a cordless handset of a cordless telephone system that is not equipped with a DSP or microprocessor, for example, an analog telephone system, that can process the embedded speakerphone algorithm. One possible solution to implement such feature is to design with "off the shelf" analog speakerphone IC in the cordless handset. However, the physical size of the IC and its supporting components makes it almost impossible to fit into a normal size handset.

Accordingly, there is a need to design a cordless telephone system that does no equipped with the DSP or digital means to support the handsfree speakerphone function of a normal cordless handset without changing the design of the cordless handset.

BRIEF SUMMARY OF THE INVENTION

Certain embodiments of the invention provide a handsfree speakerphone features on all non-DSP and non-digital telephone system and provide a flexibility to industrial designers to maintain a reasonably small handset form factor.

In some embodiments of the invention, a telephone system includes a base unit and at least one cordless handset wirelessly communicable with the base unit, wherein the base unit includes a half-duplex switching speakerphone circuitry for providing a handsfree operation for the at least one cordless handset, and wherein the half-duplex switching speakerphone circuitry detects signal levels input/output from the at least one cordless handset to determine a communication mode.

Some embodiments of the invention provide a telephone system having a handset handsfree operation. The telephone system includes a base unit, at least one cordless handset wirelessly communicable with the base unit, and a half-duplex switching speakerphone circuitry located at the base unit that controls a handsfree operation mode of the at least one cordless handset. The half-duplex switching speakerphone circuitry includes a controller for determining the handsfree operation mode based on at least one of outputs of comparators, speech detectors, and volume of a speech.

Some embodiments of the invention provide a handset handsfree operation switch for analog telephone system and a telephone system without a DSP (digital signal processing) function. Such switch includes a first comparator for comparing a transmit level and a receive level at a RF modulator side that is wirelessly coupled with at least one cordless handset, a second comparator for comparing a transmit level and a receive level at a hybrid side that is coupled with a PSTN, and a controller coupled with outputs of the first and second comparators for switching an operation mode based on the outputs. The first and second comparators and the controller are located at a base unit of the telephone system.

DETAILED DESCRIPTION OF THE INVENTION

As a handset handsfree speakerphone feature has become a standard function of a cordless telephone system, it is important that analog telephone systems or telephone systems that are not equipped with the DSP or digital means also have such handset handsfree function. Embodiments of the present invention designs an "off the shelf" analog half duplex switching speakerphone circuitry, for example, an IC, on a base unit and routes handset handsfree signals via a RF link to and from a microphone and speaker located on a handset unit. As a result of this invention, it is possible to have a handset handsfree feature on any simple analog and digital platform which is not equipped with DSPs or any other digital means for embedded speakerphone algorithms. Embodiments of the present invention also provide the handset handsfree feature on all multiple handsets of the same system without incurring any additional cost of a speakerphone IC or equivalent analog circuits.

Figure 2:
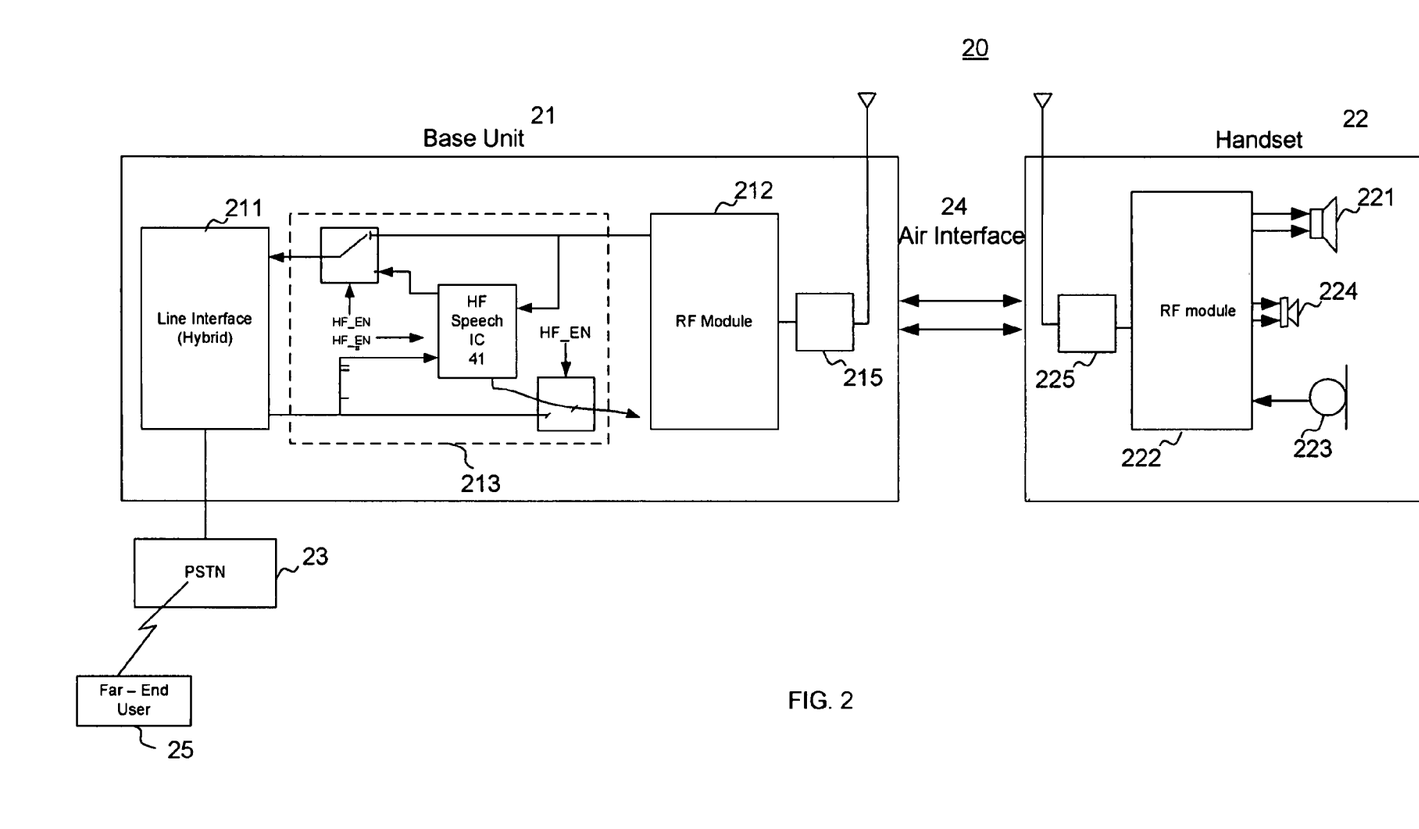
FIG. 2 is an exemplary block diagram of a non-digital telephone system that embeds a handset handsfree speakerphone algorithm in accordance with the present invention.

An exemplary embodiment of a cordless telephone system of the present invention is illustrated in FIG. 2 that includes a base unit 21 and at least one cordless handset 22 (only one shown) communicable with base unit 21 via an air interface 24. Base unit 21 includes a line interface (hybrid) circuitry 211, a RF modular 212, a half-duplex switching speakerphone circuitry 213, and a transceiver 215. In accordance with the present invention, half-duplex switching speakerphone circuitry 213 of base unit 21 is used to control a handsfree operation feature for cordless handset 22. Accordingly, cordless handset 22 may be a conventional handset that includes a transceiver 225, a RF modular 222, a speaker 221, a receiver 224 and a microphone 223.

When a user uses cordless handset 22 to talk with a far end user 25, the audio signals from cordless handset 22 uses the same loop path as described with reference to FIG. 1. However, because of increased gain, feedback from speaker 221 to microphone 223 can occur and cause oscillations. To avoid this, an attenuation may be added to a receive path when the user is talking, or to a transmit path when far end user 25 is talking. The result is a half-duplex operation much like a "walkie-talkie". However, unlike a "walkie-talkie" there is no button to press to switch between modes. Instead, speech detectors must be put in the paths to control the switching between transmitting and receiving.

Figure 3:
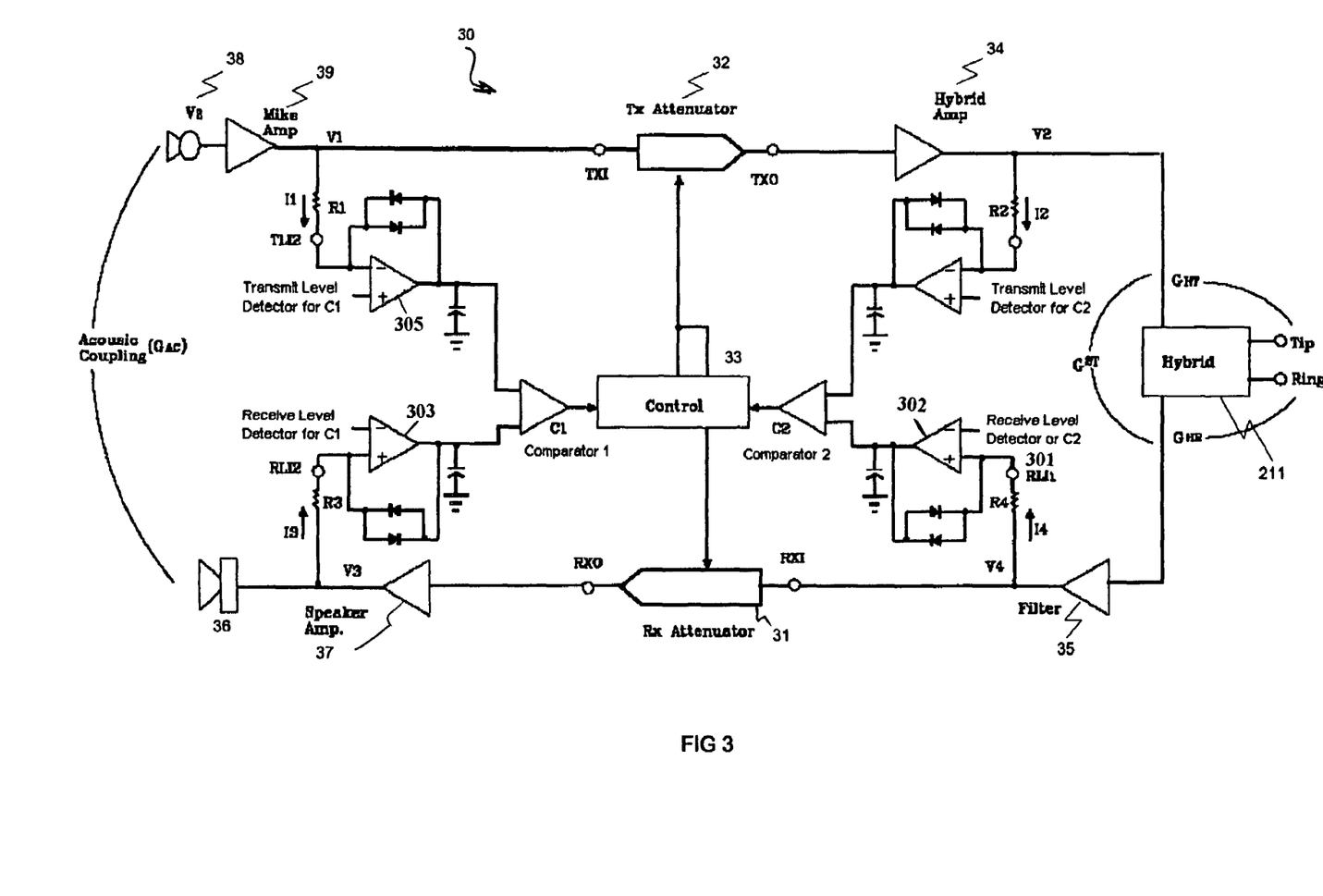
FIG. 3 illustrates an exemplary block diagram of a switched speakerphone IC that may be used in a non-digital telephone system of the present invention.

FIG. 3 illustrates a block diagram of the speech detectors and attenuation blocks needed for the half-duplex operation of a handsfree speakerphone. As described above, the half-duplex operation is performed by half-duplex switching speakerphone circuitry 213 of base unit 21. Half-duplex switching speakerphone circuitry 213 may be carried out in a single IC or several ICs. For digital telephone systems, the switching can be provided by a DSP and most digital cordless phone systems have a half-duplex speakerphone integrated into their ASIC. Adding a DSP to an analog system, however, would increase the cost such that the advantage of an analog system would no longer be cost effective. The solution in accordance with the present invention is to add a half-duplex switched speakerphone IC to the audio path.

There are many single chip solutions on the market that can provide the proper switching for a handsfree half duplex speakerphone. These single chip switching solutions are used on many products to provide the handsfree operation for a base unit speakerphone. To add this feature to the cordless handset would cause problems in the size of their packages, and the need for large external components. As a base unit has much more room than a cordless handset, the present invention adds half-duplex switching speakerphone circuitry 213 that may be in a form of a switched speakerphone IC on base unit 21 to control the switching for the microphone 223 and speaker 221 of cordless handset 22. An example of the half-duplex switched speakerphone IC used for handset handsfree operation is illustrated in FIG. 4 as IC 41, which will be described in details hereinafter.

In accordance with the present invention, half-duplex switching speakerphone circuitry 213 or switched speakerphone IC 41 is located at base unit 21 but the transducers, such as microphone 223 and speakerphone 221 are located at cordless handset 22. Instead of directly inputting the audio signals from microphone 223 to half-duplex switching speakerphone circuitry 213, the audio signals is first demodulated by RF module 212 before inputting to half-duplex switching speakerphone circuitry 213. Similarly, the audio signals received by handset transceiver 224 is modulated by handset RF module 222 before being sent to speaker amplifier (not shown).

Circuitry 30 of FIG. 3 includes a receiver (Rx) attenuator 31, a transmitter (Tx) attenuator 32, and a attenuator controller 33. Line interface (hybrid) circuitry 211 receives Tip and Ring signals from a PSTN (shown in FIG. 2.) Receiver attenuator 31 in conjunction with transmitter attenuator 32 is part of a switched speakerphone IC for controlling the handset handsfree half-duplex operation. In a receive (Rx) mode, Rx attenuator 31 may have a gain of +6 dB gain and Tx attenuator 32 may have a gain of −46 dB gain. When in a transmit mode, reversely, Rx attenuator 31 and Tx attenuator 32 may have gains of −46 dB and +6 dB, respectively. In an idle mode; each of Rx and Tx attenuators 31 and 32 may be set to −20 dB. Attenuator controller 33 determines which mode should be used depending on outputs of comparators C1 and C2, noise monitors (speech detectors), dial tone detector, and volume control. The output of the attenuator controller is measurable on pin 14 labeled CT of FIG. 4. When the voltage at this pin is equal to VB, circuitry 213 is in the idle mode. If the voltage of this pin is +240 mV, circuitry 30 in the receive mode and if it is −240 mV, it is in the transmit mode.

Figure 4:
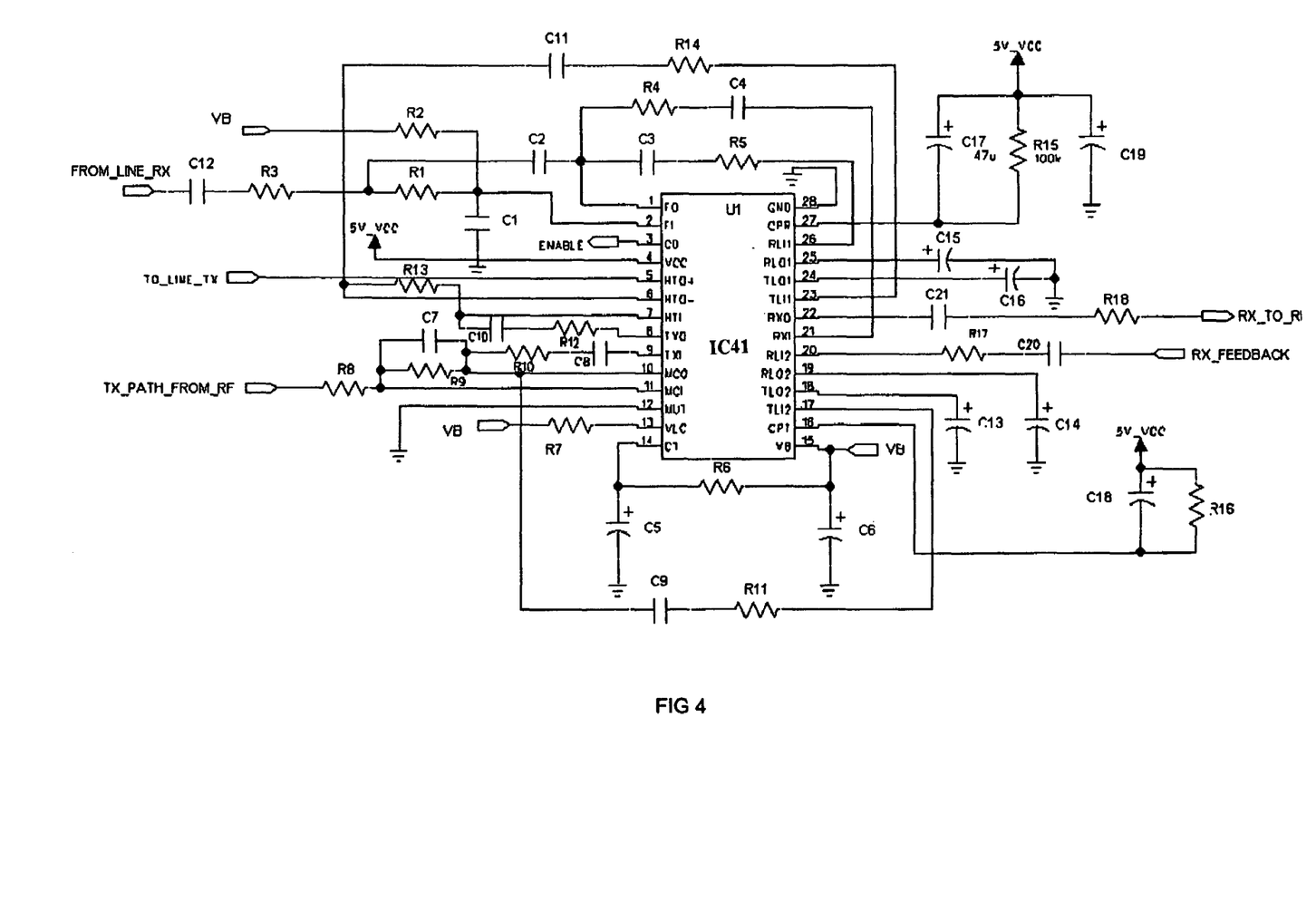
FIG. 4 illustrates an exemplary circuitry of a non-digital telephone system of the present invention.

Output at pin 15 of FIG. 4 is (Vcc−0.7)/2 and provides an AC ground for the cordless telephone system. The output impedance of VB in conjunction with a capacitor C6 forms a low pass filter for power supply rejection.

Volume control can be done at pin 13, which only effects Rx attenuator 31. In accordance with the present invention, the volume will be controlled on the Handset, therefore R7 will be short-circuit and always at max volume.

Figure 5:
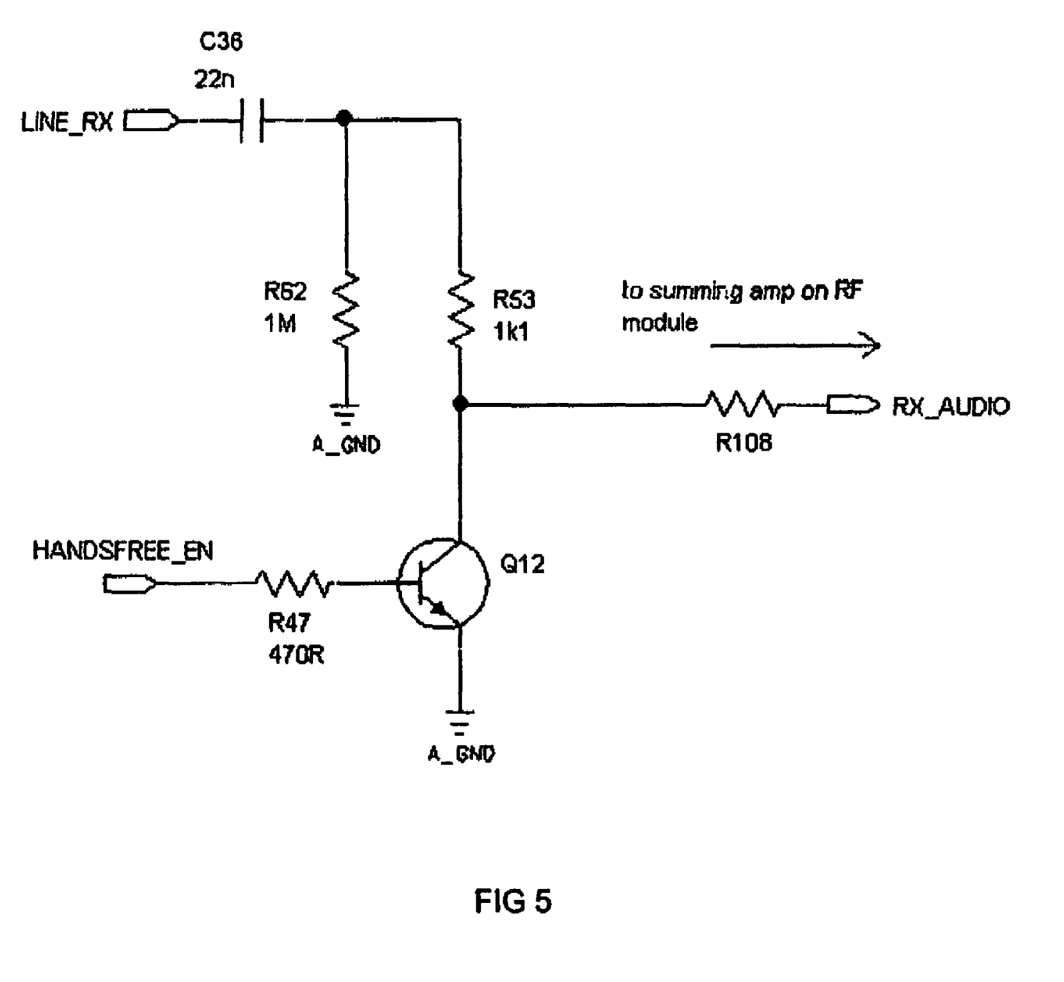
FIG. 5 illustrates an exemplary switch for controlling an audio path of a receiver.

Receiving direction of operation in accordance with the present invention is illustrated below with reference to FIGS. 3, 4, and 5, in which FIG. 5 is a circuitry illustrating a switch to control the Rx audio path.

The audio signals from the PSTN received by line interface 211 (or labeled FROM_LINE_RX in FIG. 4) is split into two paths. Path one is used for a normal handset operation that directly connects an output of line interface 211 (FIG. 2) to C36 of FIG. 5. When the audio travels through this path, switched speakerphone IC 41 is disabled giving it a high impedance at its input pins. The audio travels through C36, R53, and out to a RF module (for example RF module 222 of FIG. 2) through R108 (refer to FIG. 5). Note that HANDSFREE_EN of FIG. 5 is logic low in this scenario. This first stage of the RF module is an op-Amp which is configured as a summing amp to allow path one (normal operation output) and path two (output of switched speakerphone IC 41) to be summed together. This signal is then transmitted to handset 22 for normal operation.

Path two comes from the same output of line interface 211 (see FIG. 2) but it is connected to C12 (labeled "FROM_LINE_RX") of FIG. 4. When in a handsfree mode, switched speakerphone IC 41 is enabled by having a logic high (>2.0V) at pin 3 of switched speakerphone IC 41. When HANDSFREE_EN is logic high, it turns on a switch (Q12) of FIG. 5 shorting the signal through path one to ground.

The receive signal from C12 (FIG. 4) then goes into switched speakerphone IC 41 through R3, R1 and C2 which form a low pass filter. Such filter is illustrated in the circuitry of FIG. 3 as filter 35. When the power of the telephone system is low, filter 35 further filters a normal input signal. The output of filter 35 provides an input for RX attenuator 31 and for a receiving side of a first level detector 301 (see FIG. 3.) In FIG. 4, components C4 and R4 control a level and response that go into RX attenuator 31. In one embodiment, this first level cannot exceed −10 dBV at pin 21 based on chip specifications. Components C3 and R5 determines a level and response that go to an input to a RX level detector 302 of comparator C2 (pin 26).

After the audio signal passes through Rx attenuator 31, it is output to pin 22 and sent through C21 and R18 of FIG. 5, where it is summed back by a summing amplifier (not shown) into the normal audio path one of the RF module. The input components for the summing amplifier can be alternatively moved to the RF module so that they are closer to the Op-Amp.

The input to the receive level detector 303 of comparator 1 is at pin 20 of FIG. 4. This signal is coupled from an output of the summing amplifier (Labeled RX_FEEDBACK of FIG. 4.) Components C20 and R17 are used to control its level and response.

Preferably, the level at the output of the summing amplifier is carefully tuned to match the level at the normal mode operation. This is done to help in tuning the deviation of RF signals from the RF module.

When the signal is received at the handset side, a normal receiver amplifier (not shown) is disabled and a speaker amplifier 37 is enabled. In embodiments of the invention, the gain of speaker amplifier 37 may be considerably higher to ensure proper volume of a speaker 36 since both receiver mode and speaker mode will have similar levels at the RF module output and will share volume control.

Figure 6:
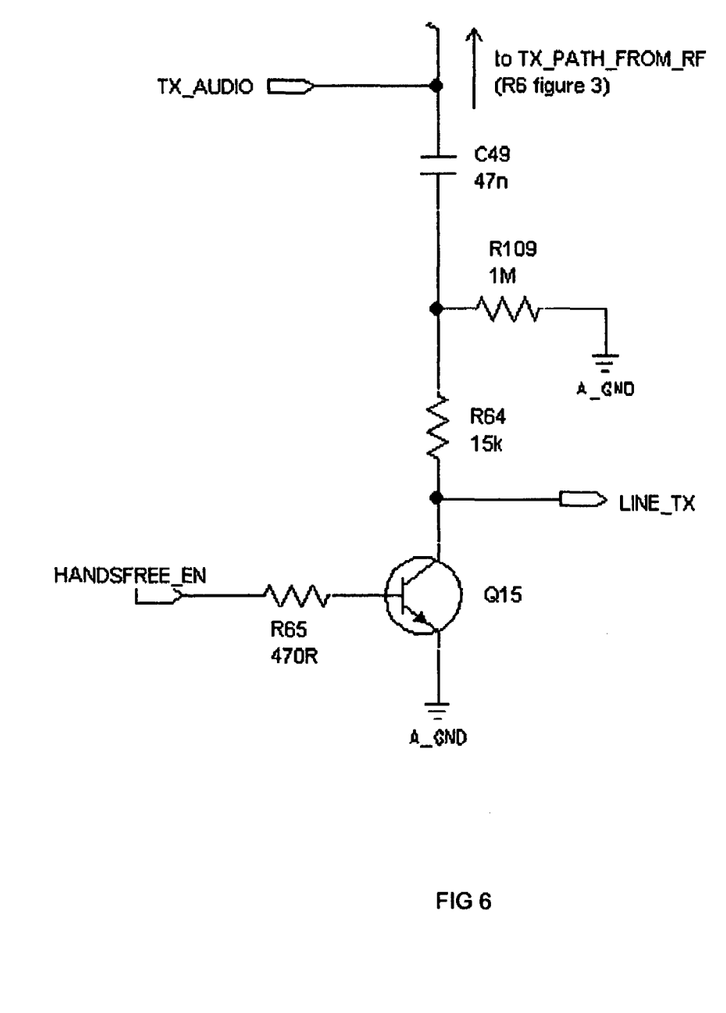
FIG. 6 illustrates an exemplary switch for controlling an audio path of a transmitter.

A transmit operation of the circuitry of FIG. 3 will be described below with reference to FIGS. 3, 4, and 6, wherein FIG. 6 illustrates a switch to control Rx audio path. Under normal transmit operation, transmit signals are coming from a same handset microphone 38 for both normal mode and handset Handsfree mode. To keep the deviation levels the same, and due to the circuit design limitations, the transmit path and the level being transmitted will be the same for both modes. Since the audio signals during the handset handsfree mode is considerably lower (i.e., the user is farther from microphone 38 so that a dBSPL level at microphone 38 is lower) an additional 6 dB may be added to the Tx path on the handset. This gain will be switched into the Tx path when in the handset handsfree mode, but not during the normal mode. As illustrated in FIG. 3, after the audio signal is received from the handset (i.e. transmitted to the base), the demodulation of the audio signal is also split into two paths.

Path one comes from RF module 212 of base unit 21 (labeled TX_AUDIO in FIG. 6) and is sent through C49, R64 and out through LINE_TX to a transmit summing amplifier at a Hybrid stage (such as line interface 211). Note that in the normal mode, HANDSFREE_EN is low and switched speakerphone IC 41 is disabled with high impedance at its input.

When HANDSFREE_EN is logic high, a switch Q15 of FIG. 6 is turned on and connects the normal path to GND. At the same time, the ASIC will enable switched speakerphone IC 41 and the signal from TX_AUDIO of FIG. 6 will go through to a point labeled TX_PATH_FROM_RF of FIG. 4. This signal is then input to a first amplifier stage of switched speakerphone IC 41. According to the present invention, the gain of the first amplifier is determined by the equation –R9/R8 and C7 (of FIG. 4) and is added for filtering. The output of microphone amplifier 39 inputs to Tx attenuator 32 and a transmit level detector 305 of comparator C1. The input level and response of Tx attenuator 32 is controlled by R10 and C8 of FIG. 4. Preferably, the input to the Tx attenuator (pin 9) cannot exceed –10 dBV. Components C9 and R11 determines a level and response to the input of the level detector 305.

The output of Tx attenuator 32 feeds directly into an output amplifier 34 of switched speakerphone IC 41 which is called "hybrid amplifier." Components R12 and R13 determine a gain of this final stage with component C10 for filtering. The output of this "hybrid amplifier" is externally connected to the transmit level detector 308 of comparator C2 through components C11 and R4, and internally connected to the input of a final amp stage of switched speakerphone IC 41. The gain of the final amp stage is internally set to –1 and its output is at pin 5. The output from pin 5 is then connected to the input of transmit hybrid amp 34 where it is summed into the audio path and sent to the PSTN.

An experimental test is done on a prototype that is built in accordance with an exemplary embodiment of the present invention. The test unit is a pass base MB prototype board with a gen2 5.8G Analog RF module. Two handsets are linked to this base for testing both normal mode and handset handsfree mode. HS# 1 is a GA Handset from the 5.8A Gen2 project and is UN-modified. HS#2 is also a GA handset from the 5.8A gen2 project, but the normal receiver path has been disabled. Instead, the EARO pin from the RF module (Rx Audio) is feed into a daughter board that has a speaker amplifier configured to add 23 dB of gain.

To simulate speech, a PC with a sound card and CID 1500 is used. The output of the sound card is looped back into the BNC input of the CID 1500 card. The telephone is then plugged into the CID 1500 machine on the PC. All of the measurements referred to in this experiment are made with a Speech Voltmeter. This speech meter measures the average power of the speech over a period of time. Unless specified otherwise, all references to levels are based on the voice file "8 k 4 voice source M2.wav" with the Speech Voltmeter measuring the entire duration of the file (15 seconds).

A first step towards tuning the speakerphone is making sure that the gains are correct by tuning the nominal gains to be the same. Through the "Normal" path, the TOLR and ROLR levels should be tuned to the desired level. (ROLR 44, TOLR –45) When these levels are satisfactory, the levels at the output of the microphone amplifier should be measured for nominal receive levels (–24 dBV @ T&R closed circuit), and the output of the transmit hybrid amplifier should be measured for nominal speech levels (88 dBSPL @ mic).

The path can then be switched to the speakerphone IC and the nominal levels at these points can be can be measured again. To ensure that the levels are being measured when the switched speakerphone IC is in Rx/Tx mode, the best method is to ground the Tx path when measuring Rx, and to ground the Rx path when measuring Tx. For example: too measure the receive gain, the Tx mode is short-circuited by connecting the Tx input of the IC to GND, thereby the IC is fully switched to Rx mode. Then the test plays "Nominal" speech level @ T&R (–24 dBV avg.) and measures the output of the microphone amplifier. The level should be at a similar level to that measured though the "Normal" path.

The "Normal" Path has 0 dB gain from the output of Line_Rx (Hybrid) to the input of the microphone amplifier.

The gains of the microphone amplifier for the "normal" path are shown in Table 1.

| Frequency | Gain (dB) |
| --- | --- |
| 300 Hz | –1.2 dB |
| 1000 Hz | +9.2 dB |
| 3000 Hz | +17.3 dB |

The Handsfree Path has 6 dB gain from the output of Line_Rx (Hybrid) to the input of the microphone amplifier.

Therefore, to keep the output of the first stage amp the same for both paths, the gain from the Handsfree path should be 6 dB less.

The gains of the microphone amplifier for the "handsfree" path are illustrated in Table 2.

| Frequency | Gain (dB) |
|---|---|
| 300 Hz | −7.2 dB |
| 1000 Hz | +3.2 dB |
| 3000 Hz | +11.3 dB |

At all levels, the output of the microphone amplifier is the same level regardless of the path.

The above same method is also used in the test for the transmit Path. In the test, as the De-Emphasis is already done on the RF module, it does not need to be considered.

The "normal" Tx path has 0 dB gain from the output of the RF module to the input of the Tx Hybrid amplifier. The Tx hybrid amplifier is where the normal path, the handsfree Path are summed into the Hybrid circuitry along with a DTMF path and a ITAD Tx path. The gain for the normal mode is $20*\log(R137/(R29+R112))=19$ dB.

The handsfree Tx has +6 dB gain from the output of the RF module to the input of the Tx hybrid amplifier. Therefore, to keep the output level of the Tx hybrid amplifier the same for both paths, the gain of the summing amplifier should be 13 dB. $20*\log(R137/R133)=12.5$ dB.

In the idle mode, the gain is −20 dB in both Tx and Rx directions.

The next step (after the gains are good in both directions independently) is to tune the switching so that the IC will switch based on who is speaking. The best way to start this is to take a previously produced unit that uses the same IC. As mentioned before, the only difference between the base speakerphone and the handset handsfree is the RF path.

As described in FIG. 3, half-duplex switching speakerphone circuitry 30 has four level detectors, two of which is on the hybrid side and two of which is on the transducer side. These level detectors feed their signals into comparator C2 on the Hybrid side and comparator C2 on the Transducer side. Comparators C1 and C2 along with a transmit noise background monitor and a receive background noise monitor dictate the output of attenuator controller 33 for the attenuators.

Furthermore, when measuring the hybrid side, the resistor at the Rx side of comparator C2 is set to 5k1 and the Tx side is set to 3k9. This gives a ratio of $20*\log(5.1/3.9)=2.3$ dB.

When measuring the "nominal" levels at the input to the comparator we get −32 dBV on the Rx side and −37 dBV on the Tx side. There is a difference of 5 dB.

The results show that the Rx is favoured for any signal >2.3 dB above the Tx level. However, the nominal levels show that the level at Rx is already 5 dB higher than the Tx. Therefore, the switching threshold occurs when the Rx is 2.7 dB above Tx when the nominal avg. speech levels are present.

This information can be used to derive a formula for calculating the resistor values based on nominal avg. speech levels at the inputs to the comparator.

$$Rx-Tx-20*\log(Rrx/Rtx)=2.7$$

Where Rx=Level measured at input to Rx side of a hybrid comparator (pin 1)
Tx=Level measured at input to Tx side of the hybrid comparator (pin 6)
Rrx=resistor at input to Rx side of the hybrid comparator (R120)
Rtx=resistor at input to Tx side of the hybrid comparator (R128)

When measuring at the attenuator side, the resistor at the Rx side of C1 is set to 5k1 and the Tx side is set to 6k2. This gives a ratio of $20*\log(5.1/6.2)=-1.7$ dB.

When measuring the "nominal" levels at the input to the comparator we get −5.4 dBV on the Rx side and −42 dBV on the Tx side. There is a difference of 36.6 dB.

The results show that the Tx is favored for any signal >1.7 dB above the Rx level. However, the nominal levels show that the level at Rx is 36.6 dB higher than the Tx. Therefore, the switching threshold occurs when the Tx is 34.9 dB above Rx when the nominal avg. speech levels are present.

This information can be used to derive a formula for calculating the resistor values based on nominal avg. speech levels at the inputs to the comparator.

$$Tx-Rx-20*\log(Rtx/Rrx)=34.9$$

where: Rx=Level measured at input to Rx side of the hybrid comparator (pin 22)
Tx=Level measured at input to Tx side of the hybrid comparator (pin 10)
Rrx=resistor at input to Rx side of the hybrid comparator (R131)
Rtx=resistor at input to Tx side of the hybrid comparator (R125)

In the above experience, the signals are taken before and after the speaker amplifier and the level measured on the Rx side is adjustable accordingly. Therefore, the formula becomes:

$$Tx-Rx-20*\log(Rtx/Rrx)=34.9-21.5, \text{ or}$$

$$Tx-Rx-20*\log(Rtx/Rrx)=13.4$$

where Rx=Level measured at input to Rx side of the hybrid comparator (pin 22)
Tx=Level measured at input to Tx side of the hybrid comparator (pin 10)
Rrx=resistor at input to Rx side of the hybrid comparator (R131)
Rtx=resistor at input to Tx side of the hybrid comparator (R125)

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A telephone system, comprising:
   a base unit; and
   at least one cordless handset wirelessly communicable with the base unit,
   wherein the base unit comprises analog half-duplex switching speakerphone circuitry for providing a handsfree operation for the at least one cordless handset, and wherein the analog half-duplex switching speakerphone circuitry detects signal levels input/output from the at least one cordless handset to determine a communication mode,
   wherein the base unit comprises a hybrid circuitry coupled with a PSTN to receive/transmit audio signals from/to the PSTN and a RF modular for demodulating audio signals received from the at least one cordless handset and modulating audio signals received from the hybrid circuitry, wherein the analog half-duplex switching speakerphone circuitry is between the hybrid circuitry and the RF modular, and
   wherein the analog half-duplex switching speakerphone circuitry further comprises:
      a first comparator for comparing a receive level and a transmit level at the RF modular side of the analog half-duplex switching speakerphone circuitry;
      a second comparator for comparing a receive level and a transmit level at the hybrid circuitry side of the analog half-duplex switching speakerphone circuitry; and
      a controller for determining an operation mode of the telephone system based on outputs of the first and second comparators.

2. The telephone system of claim 1, wherein the signals detected by the analog half-duplex switching speakerphone circuitry are transmitted between the base unit and the at least one cordless handset via an air interface.

3. The telephone system of claim 1, wherein the communication mode comprises a transmit mode, a receive mode, and an idle mode.

4. The telephone system of claim 1, wherein the base unit further comprises a line interface circuitry for receiving and/or transmitting audio signals from/to a PSTN and a RF modulator for de-modulating the audio signals received from the PSTN and modulating the audio signals received from the at least one cordless handset.

5. The telephone system of claim 1, wherein the analog half-duplex switching speakerphone circuitry comprises:
   a receive attenuator for attenuating audio signals traveling in a receive path; and
   a transmit attenuator for attenuating audio signals traveling in a transmit path.

6. The telephone system of claim 5, wherein the controller further determines whether a handset handsfree mode is reached based on the outputs of the first and second comparators.

7. The telephone system of claim 5, wherein the first comparator compares level values from a microphone amplifier and a speakerphone amplifier.

8. The telephone system of claim 5, wherein the second comparator compares level values from a hybrid amplifier and a filter.

9. The telephone system of claim 1, wherein the telephone system is one of an analog telephone system and a telephone system without a digital signal processor (DSP) function.

10. A telephone system having a handset handsfree operation, comprising:
    a base unit;
    at least one cordless handset wirelessly communicable with the base unit; and
    analog half-duplex switching speakerphone circuitry located at the base unit that controls a handsfree operation mode of the at least one cordless handset,
    wherein the analog half-duplex switching speakerphone circuitry includes a controller for determining the handsfree operation mode based on at least one of outputs of comparators, speech detectors, and volume of a speech,
    wherein the base unit comprises a hybrid circuitry coupled with a PSTN to receive/transmit audio signals from/to the PSTN and a RF modular for demodulating audio signals received from the at least one cordless handset and modulating audio signals received from the hybrid circuitry, wherein the analog half-duplex switching speakerphone circuitry is between the hybrid circuitry and the RF modular, and
    wherein the analog half-duplex switching speakerphone circuitry further comprises:
       a first comparator for comparing a receive level and a transmit level at the RF modular side of the analog half-duplex switching speakerphone circuitry;
       a second comparator for comparing a receive level and a transmit level at the hybrid circuitry side of the analog half-duplex switching speakerphone circuitry; and
       a controller for determining an operation mode of the telephone system based on outputs of the first and second comparators.

11. The telephone system of claim 10, further comprising a hybrid amplifier that is enabled when the controller determines a transmit mode for amplifying audio signals to be transmitted to the PSTN.

12. The telephone system of claim 10, further comprising a speakerphone amplifier for amplifying audio signals received by a speakerphone of the at least one cordless handset and a microphone amplifier for amplifying audio signals transmitted to a microphone of the at least one cordless handset.

13. The telephone system of claim 10, wherein the at least one cordless handset comprises a RF modulator for demodulating audio signals received from the base unit and modulating audio signals transmitted to the base unit, a speakerphone for receiving audio signals from a user and a microphone for outputting demodulated audio signals by the RF modulator.

14. A handset handsfree operation switch located in a base station and for use in an analog telephone system and a telephone system without a DSP (digital signal processing) function, the switch comprising:
    a first comparator for comparing a transmit level and a receive level at a RF modulator side that is wirelessly coupled with at least one cordless handset;
    a second comparator for comparing a transmit level and a receive level at a hybrid side that is coupled with a PSTN;
    a controller coupled with outputs of the first and second comparators for switching an operation mode based on the outputs, wherein
    the first and second comparators and the controller are located at a base unit of the telephone system.

15. The switch of claim 14, wherein the transmit level and the receive level input to the first comparator are measured at a microphone and a speakerphone of the at least one cordless handset, respectively.

16. The switch of claim 14, wherein the transmit level and the receive level input to the second comparator are measured at a hybrid amplifier and a filter, wherein the filter coupled with the hybrid side for filtering the audio signals received from the PSTN.

17. The switch of claim 14, wherein the controller transmits a switching signal to the at least one cordless handset via an air interface.

18. The switch of claim 14, wherein the switch is in a form of an integrated circuit (IC).

* * * * *